United States Patent
Raykar et al.

(10) Patent No.: US 7,035,757 B2
(45) Date of Patent: *Apr. 25, 2006

(54) THREE-DIMENSIONAL POSITION CALIBRATION OF AUDIO SENSORS AND ACTUATORS ON A DISTRIBUTED COMPUTING PLATFORM

(75) Inventors: Vikas C. Raykar, Sunnyvale, CA (US); Igor Kozintsev, San Jose, CA (US); Rainer Lienhart, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/435,231

(22) Filed: May 9, 2003

(65) Prior Publication Data

US 2004/0225470 A1    Nov. 11, 2004

(51) Int. Cl.
*G01C 17/00*    (2006.01)
*G01C 19/00*    (2006.01)

(52) U.S. Cl. .................................................. 702/150
(58) Field of Classification Search ........ 702/150–153, 702/176; 367/118, 127; 340/988–993
See application file for complete search history.

(56) References Cited

U.S. PATENT DOCUMENTS

| | | | | |
|---|---|---|---|---|
| 3,559,161 A * | 1/1971 | Raudsep | ..................... | 367/117 |
| 4,555,779 A * | 11/1985 | Roberts | ..................... | 367/19 |
| 5,778,082 A * | 7/1998 | Chu et al. | ..................... | 381/92 |
| 5,970,413 A * | 10/1999 | Gilhousen | ................ | 455/456.3 |
| 6,201,499 B1 * | 3/2001 | Hawkes et al. | ............ | 342/387 |
| 6,243,471 B1 * | 6/2001 | Brandstein et al. | ........... | 381/92 |
| 6,643,516 B1 * | 11/2003 | Stewart | .................. | 340/539.13 |
| 6,661,342 B1 * | 12/2003 | Hall et al. | ............... | 340/573.1 |
| 6,662,137 B1 * | 12/2003 | Squibbs | ...................... | 702/159 |
| 6,677,895 B1 * | 1/2004 | Holt | ......................... | 342/357.1 |
| 2002/0097885 A1 * | 7/2002 | Birchfield et al. | ............ | 381/92 |
| 2002/0150263 A1 * | 10/2002 | Rajan | .......................... | 381/92 |
| 2002/0155845 A1 * | 10/2002 | Martorana | ................... | 455/456 |
| 2002/0168989 A1 * | 11/2002 | Dooley et al. | .............. | 455/456 |
| 2003/0012168 A1 * | 1/2003 | Elson et al. | ................ | 370/338 |
| 2003/0014486 A1 * | 1/2003 | May | ........................... | 709/204 |
| 2003/0114170 A1 * | 6/2003 | Rick et al. | .................. | 455/456 |
| 2003/0129996 A1 * | 7/2003 | Maloney et al. | ............ | 455/456 |
| 2003/0174086 A1 * | 9/2003 | Hirt | ............................. | 342/42 |
| 2003/0236866 A1 | 12/2003 | Light | | |
| 2004/0170289 A1 * | 9/2004 | Whan | .......................... | 381/92 |

FOREIGN PATENT DOCUMENTS

| | | |
|---|---|---|
| GB | 2 329 778 A | 3/1999 |
| WO | WO 01/26335 A | 4/2001 |
| WO | PCT/US2004/008587 | 1/2005 |

* cited by examiner

*Primary Examiner*—Bryan Bui
*Assistant Examiner*—Demetrius Pretlow
(74) *Attorney, Agent, or Firm*—Blakely, Sokoloff, Taylor & Zafman LLP

(57) ABSTRACT

A first computing device transmitting a wireless signal to a second and third computing devices, the signal requesting an actuator of the second computing device generate an acoustic signal to be received by a sensor of the third computing device, wherein the actuator and sensor are unsynchronized. The first computing device computes, based on an time estimate for the acoustic signal to travel from the actuator of the second computing device to the sensor of the third computing device, a physical location of the actuator of the second computing device and the sensor of the third computing device.

39 Claims, 3 Drawing Sheets

THREE-DIMENSIONAL POSITION CALIBRATION OF AUDIO SENSORS AND ACTUATORS ON A DISTRIBUTED COMPUTING PLATFORM

TECHNICAL FIELD

Embodiments described herein relate to position calibration of audio sensors and actuators in a distributed computing platform.

BACKGROUND

Many emerging applications like multi-stream audio/video rendering, hands free voice communication, object localization, and speech enhancement, use multiple sensors and actuators (like multiple microphones/cameras and loudspeakers/displays, respectively). However, much of the current work has focused on setting up all the sensors and actuators on a single platform. Such a setup would require a lot of dedicated hardware. For example, to set up a microphone array on a single general purpose computer, would typically require expensive multichannel sound cards and a central processing unit (CPU) with larger computation power to process all the multiple streams.

Computing devices such as laptops, personal digital assistants (PDAs), tablets, cellular phones, and camcorders have become pervasive. These devices are equipped with audio-visual sensors (such as microphones and cameras) and actuators (such as loudspeakers and displays). The audio/video sensors on different devices can be used to form a distributed network of sensors. Such an ad-hoc network can be used to capture different audio-visual scenes (events such as business meetings, weddings, or public events) in a distributed fashion and then use all the multiple audio-visual streams for an emerging applications. For example, one could imagine using the distributed microphone array formed by laptops of participants during a meeting in place of expensive stand alone speakerphones. Such a network of sensors can also be used to detect, identify, locate and track stationary or moving sources and objects.

To implement a distributed audio-visual I/O platform, includes placing the sensors, actuators and platforms into a space coordinate system, which includes determining the three-dimensional positions of the sensors and actuators.

DETAILED DESCRIPTION

Embodiments of a three-dimensional position calibration of audio sensors and actuators in a distributed computing platform are disclosed. In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
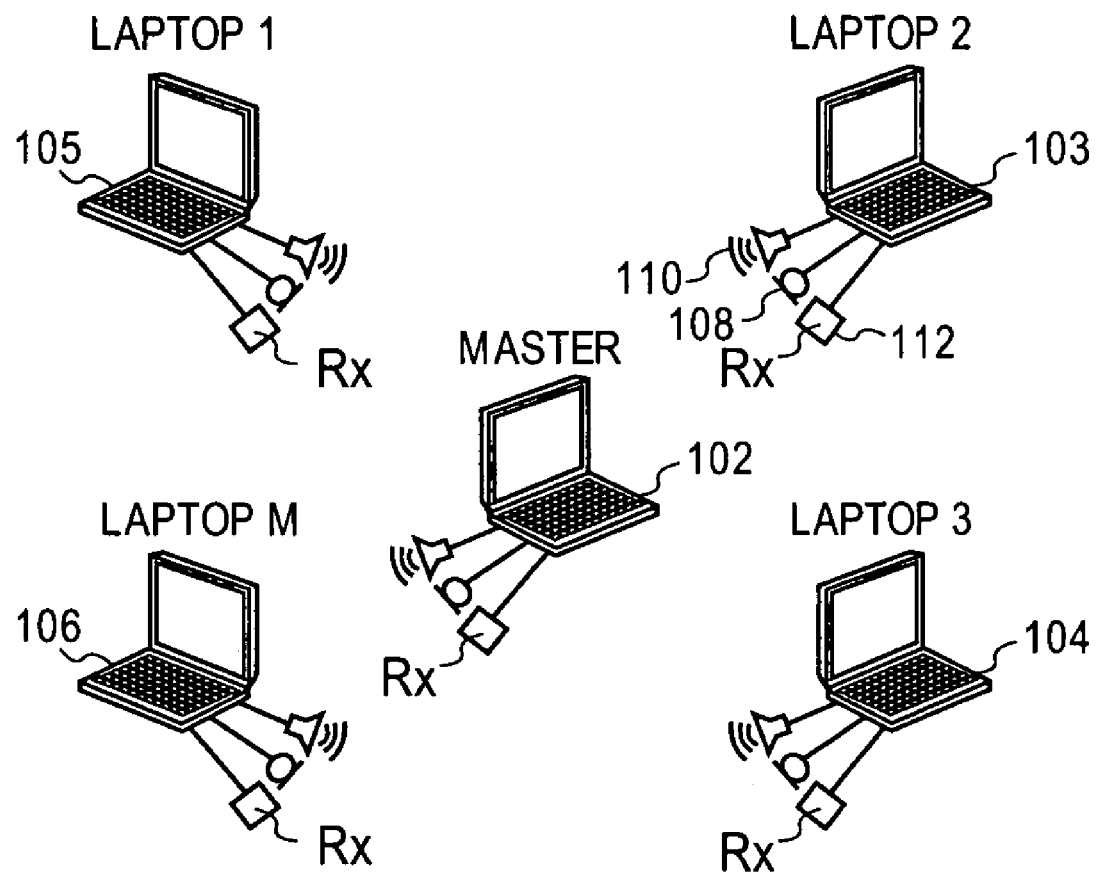
FIG. 1 illustrates a schematic representation of a distributed computing in accordance with one embodiment.

FIG. 1 illustrates a schematic representation of a distributed computing platform consisting of a set of General-Purpose Computers (GPC)102–106 (sometimes referred to as computing devices). GPC 102 is configured to be the master, and performs the location estimation. The GPCs (102–106) shown in FIG. 1 may include a personal computer (PC), laptop, PDA, tablet PC, or other computing devices. In one embodiment, each GPC is equipped with audio sensors 108 (e.g., microphones), actuators 110 (e.g., loudspeakers), and wireless communication capabilities 112. As is explained in more detail below, the sensors and actuators of the multiple GPCs are used to estimate their respective physical locations.

For example, in one embodiment, given a set of M acoustic sensors and S acoustic actuators in unknown locations, one embodiment estimates their respective three dimensional coordinates. The acoustic actuators are excited using a predetermined calibration signal such as a maximum length sequence or chirp signal, and the time of arrival (TOA) is estimated for each pair of the acoustic actuators and sensors. In one embodiment, the TOA for a given pair of microphone and speakers is defined as the time for the acoustic signal to travel from the speaker to the microphone. Measuring the TOA and knowing the speed of sound in the acoustical medium, the distance between each acoustical signal source and the acoustical sensors can be calculated, thereby determining the three dimensional positions of the actuators and the sensors.

Figure 2:
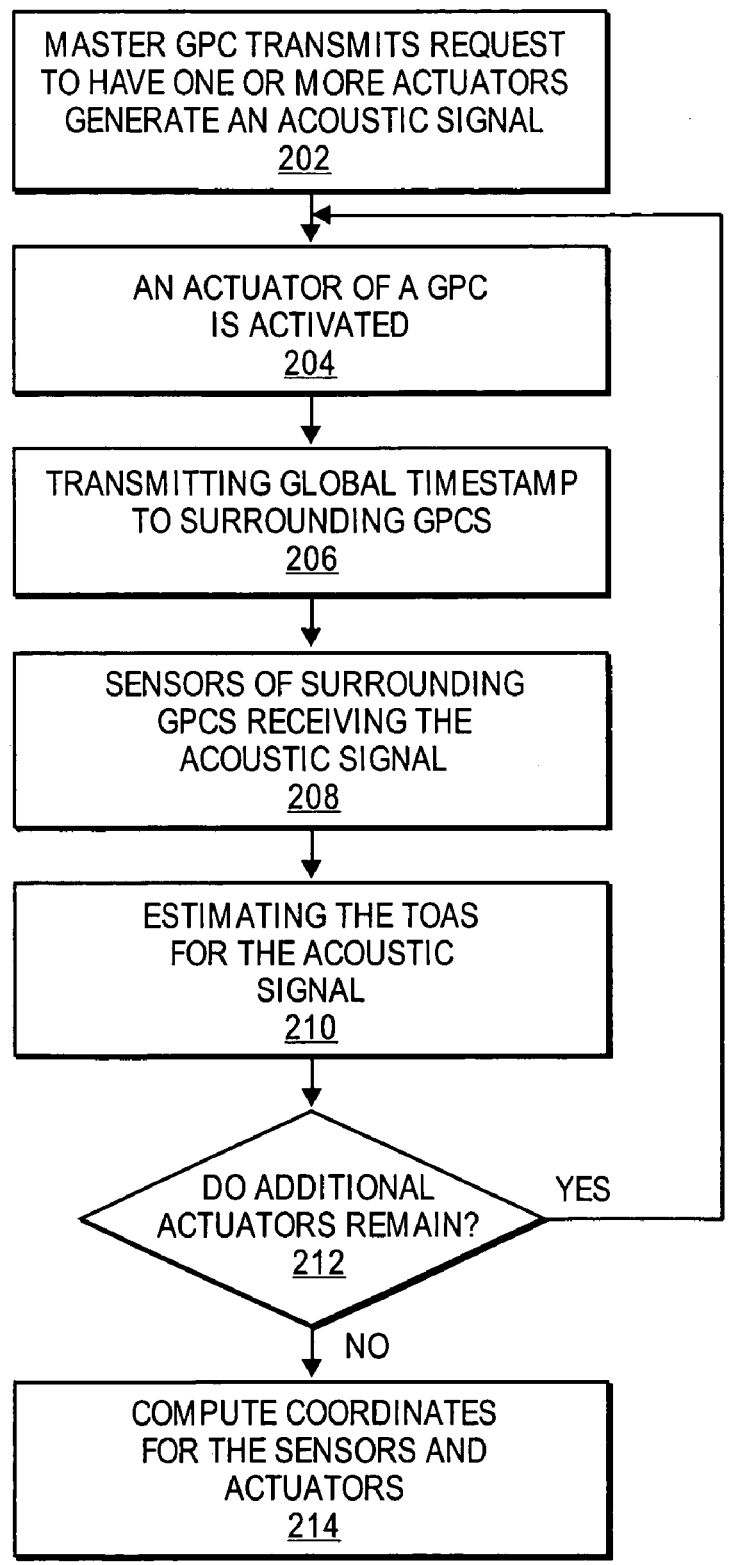
FIG. 2 is a flow diagram describing the process of generating position ion for audio sensors and actuators in accordance with one embodiment.

FIG. 2 is a flow diagram describing, in greater detail, the process of generating the three-dimensional position calibration of audio sensors and actuators in a distributed computing platform, according to one embodiment. The process described in the flow diagram of FIG. 2 periodically references the GPCs of the distributed computer platform illustrated in FIG. 1.

In block 202, a first GPC 102, which may be considered the master GPC of the distributed platform, transmits a wireless signal to a surrounding set of GPCs in the distributed platform (the actual number of GPCs included in the distributed platform may vary based on implementation). The signal from the first GPC 102 includes a request that a specific actuator of one of the GPCs (e.g., second GPC 103) be excited to generate an acoustic signal to be received by the sensors of the surrounding GPCs (e.g., GPC 102, 104–106). In one embodiment, the initial wireless signal from the master GPC 102 identifies the specific actuator 110 to be excited.

In response to the signal from the master GPC 102, in block 204 the second GPC 103 excites the actuator 110 to generate an acoustic signal. In one embodiment, the acoustic signal may be a maximum length sequence or chirp signal, or another predetermined signal. In block 206, the second GPC 103 also transmits a first global time stamp to the other GPCs 104–106. In one embodiment, the global time stamp identifies when the second GPC 103 initiated the actuation of the actuator 110 for the second GPC 103. In block 208, the sensors of the GPCs 102, 104–106, receive the acoustic signal generated by the second GPC 103.

In block 210, the time for the acoustic signal to travel from the actuator 110 of the second GPC 103 to the respective sensors (hereinafter referred to as Time of Arrival (TOA)), is estimated. In one embodiment, the TOA for a given pair of a microphone and speaker is defined as the time taken by the acoustic signal to travel form the speaker to the microphone.

In one embodiment, the GPCs that receive the acoustic signal via their sensors, proceed to estimate the respective TOAs. In one embodiment, there exists a common clock in the distributed platform so that GPCs 102–106 are able to determine the time of arrival of audio samples captured by the respective sensors. As a result, the TOA can be estimated based on the difference between the first global time stamp issued by the second GPC 103 and the time of when the acoustic signal is received by a sensor.

Considering, however, that sensors are distributed on different platforms, the audio stream among the different GPCs are typically not synchronized in time (e.g., analog-to-digital and digital-to-analog converters of actuators and sensors of the different GPCs are unsynchronized). As a result, the estimated TOA does not necessarily correspond to the actual TOA. In particular, the TOA of the acoustic signal may include an emission start time, which is defined as the time after which the sound is actually emitted from the speaker (e.g., actuator 110) once the command has been issued from the respective GPC (e.g., GPC 103). The actual emission start time is typically never zero and can actually vary in time depending on the sound card and processor load of the respective GPC.

Therefore, to account for the variations in the emission start time, multiple alternatives may be used. For example, in one embodiment, if multiple audio input channels are available on the GPC exciting an actuator, then one of the output channels can be connected directly to one of the input channels forming a loop-back. Source emission start time can then be estimated for a given speaker, and can be globally transmitted to the other GPCs 102, 104–106 to more accurately determine the respective TOAs. Furthermore, in one embodiment, in the case of using the loop-back, the estimated emission start time will be included in the global time stamp transmitted by the respective GPC.

Once the TOAs for the acoustic signal have been estimated by the receiving GPCs 104–106, which may include accounting for the unknown emission start time as described above, the TOAs are transmitted to the master GPC 102. In an alternative embodiment, the TOAs can be computed by the master GPC 102, in which case each sensor of GPCs 104–106 generate a second global timestamp of when the acoustic signals arrived, respectively. In the alternative embodiment, the master GPC 102 uses the first global time stamp (identifying when the second GPC 103 initiated the actuation of the actuator 110) and the second global time stamps to estimate the TOAs for the respective pairs of actuators and sensors. In such as case, the master GPC 102 may also estimate the emission start time of the acoustic signal to estimate the TOAs.

In decision block 212, if additional actuators remain in the distributed platform, the processes of blocks 202–210 are repeated to have each of the actuators in the platform generate an acoustic signal to determine the TOAs with respective receiving sensors. In an alternative embodiment, multiple separate actuators may be actuated in parallel, wherein the actuator signals are multiplexed by each actuator using a unique signal (e.g., different parameters for chirp or MLS signals). In the case of actuating the multiple separate actuators in parallel, the master GPC 102 identifies to each actuator a unique signal parameters to be used when exciting the actuator.

Figure 3:
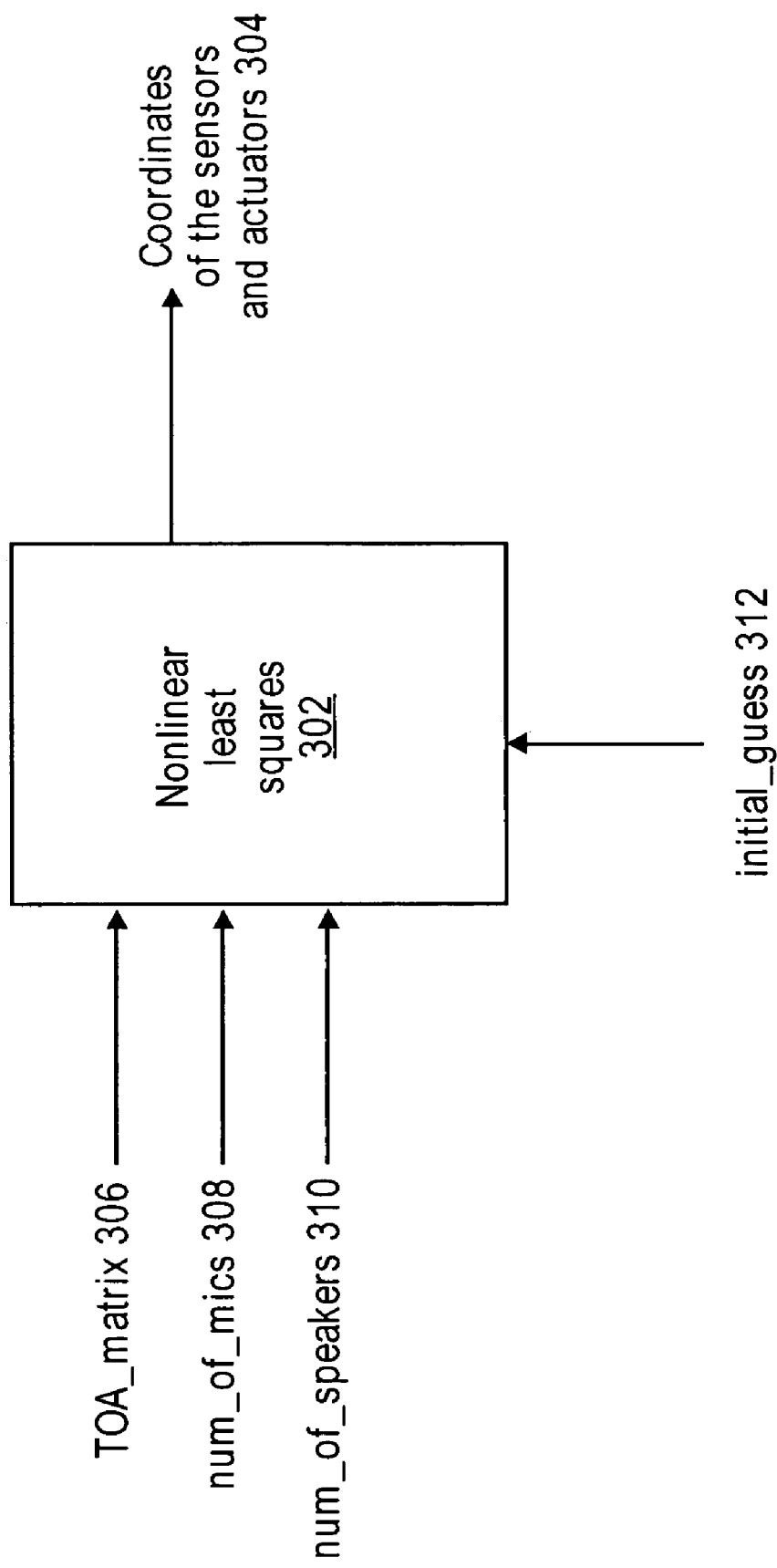
FIG. 3 illustrates a computation scheme to generate position coordinates.

Once all of the TOAs for the different pairs of actuators and sensors have been computed and transmitted to the master GPC 102, in block 214 the master GPC 102 computes the coordinates of the sensors and the actuators. More specifically, as illustrated in the position computation scheme of FIG. 3, in one embodiment the master GPC 102, utilizes a nonlinear least squares (NLS) computation 302 to determine the coordinates 304 of the actuators and/or sensors. In one embodiment, the NLS computation 302 considers the TOAs 306, the number of microphones 308 and the number of speakers 310 in the platform, along with an initial estimation 312 at the coordinates of the actuators and speakers. The actual computation used by the master GPC 102 to compute the coordinates of the actuators and sensors based on the TOAs may vary based on implementation. For example, in an alternative embodiment to compute the positions of sensors and actuators with unknown emission start times, the NLS procedure is used to jointly estimate the positions and the emission times. Emission times add extra S (number of actuators) variables to the computation procedure.

To provide the initial estimation as used by the NLS, several alternatives are available. For example, if an approximate idea of the microphone and speaker positions is available, then the initialization may be done manually. In another embodiment, the use of one or more cameras may provide a rough estimate to be used as the initial estimation.

An additional embodiment to generate an initial estimation includes assuming that microphones and speakers on a given computing platform are approximately at the same position, and given all estimates of the pairwise distances between the separate GPCs, a multidimensional scaling approach may be used to determine the coordinates from, in one embodiment, the Euclidean distance matrix. The approach involves converting the symmetric pairwise distance matrix to a matrix of scalar products with respect to some origin and then performing a singular value decomposition to obtain the matrix of coordinates. The matrix coordinates in turn, may be used as the initial guess or estimate of the coordinates for the respective GPCs, and the microphones and speakers located on them.

The techniques described above can be stored in the memory of one of the computing devices or GPCs as a set of instructions to be executed. In addition, the instructions to perform the processes described above could alternatively be stored on other forms of computer and/or machine-readable media, including magnetic and optical disks. Further, the instructions can be downloaded into a computing device over a data network in a form of compiled and linked version.

Alternatively, the logic to perform the techniques as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method comprising:
   an actuator of a first computing device generating an acoustic signal;
   a sensor of a second computing device receiving the acoustic signal;
   generating an estimate of a time for the acoustic signal to travel from the actuator to the sensor, wherein the sensor and actuator are unsynchronized;
   a third computing device computing, based on the time estimate, a physical location of at least one of a set including the sensor of the second computing device and the actuator of the first computing device,
   a sensor of fourth computing device receiving the acoustic signal; and generating a second estimate of a time for the acoustic signal to travel from the actuator to the sensor of the fourth computing device, wherein the actuator of the first computing device and the sensor of the fourth computing device are unsynchronized; and
   the third computing device computing, based on the second estimate of time, a physical location of at least one of a set including the sensor of the fourth computing device and the actuator of the first computing device.

2. The method of claim 1, wherein the method further includes:
   an actuator of the second computing device generating a second acoustic signal;
   a sensor of a first computing device receiving the acoustic signal;
   generating a third estimate of a time for the second acoustic signal to travel from the actuator of the second computing device to the sensor of the first computing device; and
   the third computing device computing, based on the third estimate of time, a physical location of at least one of a set including the sensor of the first computing device and the actuator of the second computing device.

3. The method of claim 2, wherein the actuator is a speaker.

4. The method of claim 3, wherein the sensor is a microphone.

5. The method of claim 4, wherein the acoustic signals generated by the first and second computing devices are selected from a group comprising of maximum length sequence signal and a chirp signal.

6. The method of claim 1, further including:
   estimating an emission start time of when the acoustic signal was emitted from the actuator.

7. The method of claim 6, wherein the estimating of the emission start time includes the first computing device using a loopback device to estimate the emission start time; and
   using the emission start time to determine the estimate of a time for the acoustic signal to travel from the actuator of the first computing device to the sensor second computing device.

8. The method of claim 1, wherein the method further includes prior to the third computing device computing the physical locations, computing an initial estimation of the physical location of the sensor of the second computer and actuator of the first computer via a video modality.

9. The method of claim 1, wherein the method further includes prior to the third computing device computing the physical locations of the sensor of the second computer, computing an initial estimation of the physical location of the sensor of the second computer and actuator of the first computer via multidimensional scaling.

10. A method comprising:
    a first computing device transmitting a wireless signal to a second and third computing devices, the signal requesting an actuator of the second computing device generate an acoustic signal to be received by a sensor of the third computing device, wherein the actuator and sensor are unsynchronized; and
    the first computing device computing, based on a time estimate for the acoustic signal to travel from the actuator of the second computing device to the sensor of the third computing device, a physical location of at least one of a set including the actuator of the second computing device and the sensor of the third computing device.

11. The method of claim 10, wherein the method further includes:
    the first computing device transmitting the wireless signal to the second and a fourth computing devices, the signal requesting the actuator of the second computing device generate the acoustic signal to be received by a sensor of the fourth computing device, wherein the actuator and the sensor of the fourth computing device are unsynchronized; and
    the first computing device computing, based on an time estimate for the acoustic signal to travel from the actuator of the second computing device to the sensor of the fourth computing device, a physical location of at least one of a set including the actuator of the second computing device and the sensor of the fourth computing device.

12. The method of claim 11, wherein the method further includes:
    the first computing device transmitting a second wireless signal to the second and third computing devices, the signal requesting an actuator of the third computing device generate an acoustic signal to be received by a sensor of the second computing device, wherein the actuator of the third computing device and a sensor of the second computing device are unsynchronized; and
    the first computing device computing, based on an time estimate for the acoustic signal to travel from the actuator of the third computing device to the sensor of the second computing device, a physical location of at least one of a set including the actuator of the third computing device and the sensor of the second computing device.

13. The method of claim 12, wherein the actuator is a speaker.

14. The method of claim 13, wherein the sensor is a microphone.

15. The method of claim 14, wherein the acoustic signals to be generated by the second and third computing devices are selected from a group comprising of maximum length sequence signal, and a chirp signal.

16. The method of claim 10, further including: estimating an emission start time of when the acoustic signal was emitted from the actuator of the second computing device.

17. The method of claim 16, wherein estimating the emission start time includes the second computing device using a loopback device to estimate the emission start time; using emission start time to determine the estimate of a time for the acoustic signal to travel from the actuator of the second computing device to the sensor third computing device.

18. The method of claim 10, wherein the method further includes:
prior to the first computer determining a physical location of at least one of the group including the actuator of the second computing device and the sensor of the third computer, the first computer computing an initial estimation of the physical location of the actuator of the second computer and the sensor of the third computing device via video modality.

19. The method of claim 10, wherein the method further includes:
prior to the first computer determining a physical location of at least one of the group including the actuator of the second computing device and the sensor of the third computer, the first computer computing an initial estimation of the physical location of the actuator of the second computer and the sensor of the third computing device via video modality.

20. A machine readable medium having stored thereon a set of instructions, which when executed, cause the machine to perform a method comprising of:
an actuator of a first computing device generating an acoustic signal;
a sensor of a second computing device receiving the acoustic signal;
generating an estimate of a time for the acoustic signal to travel from the actuator to the sensor, wherein the sensor and actuator are unsynchronized; and
a third computing device computing, based on the time estimate, a physical location of at least one of a set including the sensor of the second computing device and the actuator of the first computing device.

21. The machine readable medium of claim 20, wherein the method further includes:
a sensor of a fourth computing device receiving the acoustic signal; and
generating a second estimate of a time for the acoustic signal to travel from the actuator to the sensor of the fourth computing device, wherein the actuator of the first computing device and the sensor of the fourth computing device are unsynchronized; and
the third computing device computing, based on the second estimate of time, a physical location of at least one of a set including the sensor of the fourth computing device and the actuator of the first computing device.

22. The machine readable medium of claim 21, wherein the method further includes:
an actuator of the second computing device generating a second acoustic signal;
a sensor of a first computing device receiving the acoustic signal;
generating a third estimate of a time for the second acoustic signal to travel from the actuator of the second computing device to the sensor of the first computing device; and
the third computing device computing, based on the third estimate of time, a physical location of at least one of a set including the sensor of the first computing device and the actuator of the second computing device.

23. The machine readable medium of claim 22, wherein the actuator is a speaker.

24. The machine readable medium of claim 23, wherein the sensor is a microphone.

25. The machine readable medium of claim 24, wherein the acoustic signals generated by the first and second computing devices are selected from a group comprising of maximum length sequence signal and a chirp signal.

26. The machine readable medium of claim 20, further including:
estimating an emission start time of when the acoustic signal was emitted from the actuator.

27. The machine readable medium of claim 26, wherein the estimating of the emission start time includes the first computing device using a loopback device to estimate the emission start time; and
using the emission start time to determine the estimate of a time for the acoustic signal to travel from the actuator of the first computing device to the sensor second computing device.

28. The machine readable medium of claim 20, wherein the method further includes:
prior to the third computing device computing the physical locations, computing an initial estimation of the physical location of the sensor of the second computer and actuator of the first computer via a video modality.

29. The machine readable medium of claim 20, wherein the method further includes:
prior to the third computing device computing the physical locations, computing an initial estimation of the physical location of the sensor of the second computer and actuator of the first computer via multidimensional scaling.

30. A machine readable medium having stored thereon a set of instructions, which when executed, cause the machine to perform a method comprising of:
a first computing device transmitting a wireless signal to a second and third computing devices, the signal requesting an actuator of the second computing device generate an acoustic signal to be received by a sensor of the third computing device, wherein the actuator and sensor are unsynchronized; and
the first computing device computing, based on a time estimate for the acoustic signal to travel from the actuator of the second computing device to the sensor of the third computing device, a physical location of at least one of a set including the actuator of the second computing device and the sensor of the third computing device.

31. The machine readable medium of claim 30, wherein the method further includes:
the first computing device transmitting the wireless signal to the second and a fourth computing devices, the signal requesting the actuator of the second computing device generate the acoustic signal to be received by a sensor of the fourth computing device, wherein the actuator and the sensor of the fourth computing device are unsynchronized; and
the first computing device computing, based on an time estimate for the acoustic signal to travel from the actuator of the second computing device to the sensor of the fourth computing device, a physical location of at least one of a set including the actuator of the second computing device and the sensor of the fourth computing device.

32. The machine readable medium of claim 31, wherein the method further includes:
the first computing device transmitting a second wireless signal to the second and third computing devices, the signal requesting an actuator of the third computing device generate an acoustic signal to be received by a sensor of the second computing device, wherein the actuator of the third computing device and a sensor of the second computing device are unsynchronized; and the first computing device computing, based on an time estimate for the acoustic signal to travel from the actuator of the third computing device to the sensor of the second computing device, a physical location of at least one of a set including the actuator of the third computing device and the sensor of the second computing device.

33. The machine readable medium of claim 32, wherein the actuator is a speaker.

34. The machine readable medium of claim 33, wherein the sensor is a microphone.

35. The machine readable medium of claim 34, wherein the acoustic signals to be generated by the second and third computing devices are selected from a group comprising of maximum length sequence signal, and a chirp signal.

36. The machine readable medium of claim 30, further including:

estimating an emission start time of when the acoustic signal was emitted from the actuator of the second computing device.

37. The machine readable medium of claim 36, wherein estimating the emission start time includes the second computing device using a loopback device to compute the emission start time;

using emission start time to determine the estimate of a time for the acoustic signal to travel from the actuator of the second computing device to the sensor third computing device.

38. The machine readable medium of claim 30, wherein the method further includes:

prior to the first computer determining a physical location of at least one of the group including the actuator of the second computing device and the sensor of the third computer, the first computer computing an initial estimation of the physical location of the actuator of the second computer and the sensor of the third computing device via video modality.

39. The machine readable medium of claim 30, wherein the method further includes:

prior to the first computer determining a physical location of at least one of the group including the actuator of the second computing device and the sensor of the third computer, the first computer computing an initial estimation of the physical location of the actuator of the second computer and the sensor of the third computing device via video modality.

* * * * *